(12) United States Patent
Tanaka et al.

(10) Patent No.: US 10,059,572 B2
(45) Date of Patent: Aug. 28, 2018

(54) CORE GRASPING METHOD

(71) Applicant: TOYOTA JIDOSHA KABUSHIKI KAISHA, Toyota-shi, Aichi-ken (JP)

(72) Inventors: Yoshitaka Tanaka, Miyoshi (JP); Makoto Kikuchi, Nisshin (JP); Tsubasa Ito, Nagoya (JP); Mitsuhiro Ishikura, Toyota (JP); Masaki Kobune, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/714,392

(22) Filed: Sep. 25, 2017

(65) Prior Publication Data

US 2018/0105401 A1 Apr. 19, 2018

(30) Foreign Application Priority Data

Oct. 14, 2016 (JP) ................. 2016-202324

(51) Int. Cl.
*B66C 1/46* (2006.01)
*B22C 23/00* (2006.01)
*B25J 15/00* (2006.01)

(52) U.S. Cl.
CPC ............. *B66C 1/46* (2013.01); *B22C 23/00* (2013.01); *B25J 15/00* (2013.01); *B25J 15/0047* (2013.01)

(58) Field of Classification Search
CPC ................ B25J 15/0047; B66C 1/46
See application file for complete search history.

(56) References Cited

U.S. PATENT DOCUMENTS

| 5,425,441 A | 6/1995 | Landua et al. | |
| 2012/0291872 A1* | 11/2012 | Brady | G01N 35/1065 137/3 |
| 2015/0239129 A1* | 8/2015 | Buchloh | B25J 15/0047 294/81.6 |
| 2015/0239130 A1* | 8/2015 | Buchloh | B25J 15/0047 294/65.5 |
| 2016/0068372 A1* | 3/2016 | Kashihara | B25J 15/0047 414/751.1 |
| 2017/0253357 A1* | 9/2017 | Mizote | B25J 15/0047 |
| 2018/0104782 A1* | 4/2018 | Tanaka | B23Q 7/165 |

FOREIGN PATENT DOCUMENTS

JP H05-509071 A 12/1993

* cited by examiner

*Primary Examiner* — Gerald McClain
(74) *Attorney, Agent, or Firm* — Oliff PLC

(57) ABSTRACT

Provided is a core grasping method of grasping a core using a core grasping apparatus. The core grasping apparatus includes grasping devices respectively having expandable and contractible grasping parts. The core includes holes, and at least one of the holes has an inside diameter that decreases in the opposite direction from a direction of a turning moment occurring on the core. The core grasping method involves, when grasping the core, expanding the grasping parts inserted in the holes so as to bring the grasping parts into contact with inner walls of the holes of the core, and grasping the core and applying a force that suppresses the turning moment to the core.

5 Claims, 16 Drawing Sheets

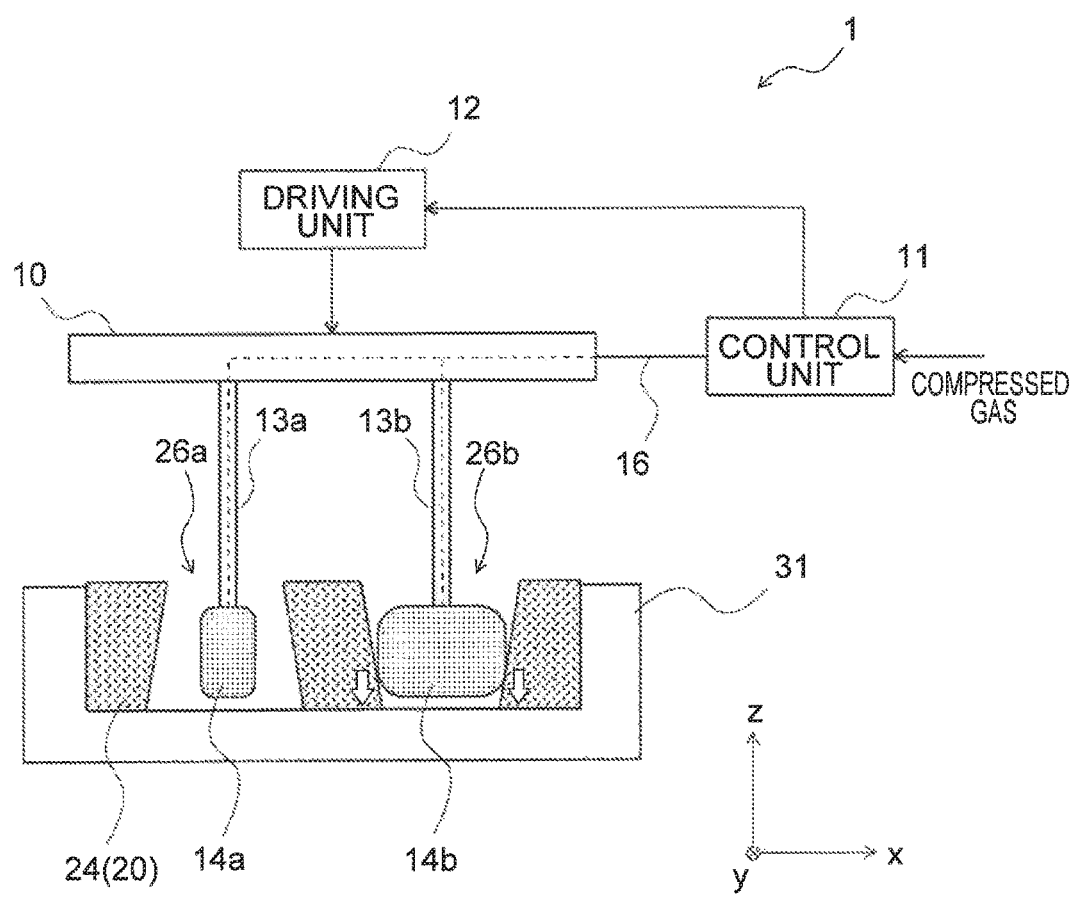

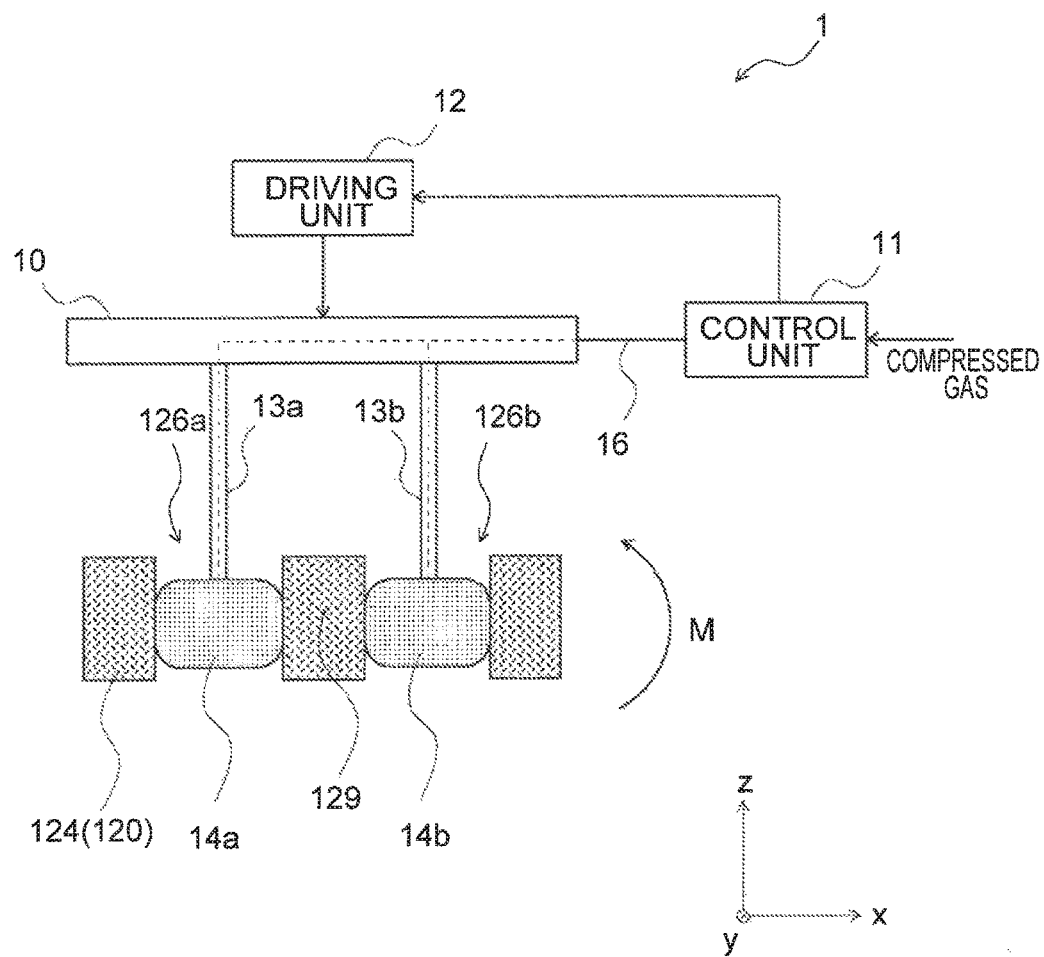

CORE GRASPING METHOD

INCORPORATION BY REFERENCE

The disclosure of Japanese Patent Application No. 2016-202324 filed on Oct. 14, 2016 including the specification, drawings and abstract is incorporated herein by reference in its entirety.

BACKGROUND

1. Technical Field

The present disclosure relates to a core grasping method.

2. Description of Related Art

A casting core is a mold that is used to form a hollow inside a cast article to be produced. Conventionally, cores are manually placed inside dies. In recent years, however, the increasing accuracy of cast articles has made it increasingly important to dispose cores inside dies with high accuracy. Accordingly, it is more important than ever to develop a technique for disposing cores inside dies with high accuracy.

Published Japanese Translation of PCT application No. 05-509071 discloses a technique related to a conveyor that conveys casting cores.

SUMMARY

Among existing methods of grasping a core is a method of grasping a core using a picker (grasping device) that has an expandable and contractible grasping part at a leading end. In this method, a core is grasped by inserting the grasping part of the picker into a hole formed in the core and expanding the grasping part so as to fix the picker to the hole of the core.

However, depending on the shape of the core, a turning moment occurs on the core around a predetermined central axis. Thus, when the core is grasped by inserting the grasping part of the picker into the hole of the core and expanding the grasping part, the core inclines upon being lifted up as a turning moment acts thereon around a predetermined central axis, which results in lower positional accuracy in disposing the core.

The present disclosure provides a core grasping method that can improve the positional accuracy in disposing a core.

A core grasping method according to the present disclosure is a core grasping method of grasping, using a core grasping apparatus, a core on which a turning moment occurs around a predetermined central axis. The core grasping apparatus includes first and second grasping devices respectively having expandable and contractible first and second grasping parts. The core includes first and second holes that are provided respectively on both sides in a horizontal direction around the central axis and open in a vertical direction. At least one of the first and second holes has the inside diameter that decreases in an opposite direction from the direction of the turning moment occurring on the core. The core grasping method involves, when grasping the core, moving the first and second grasping devices downward and inserting the first and second grasping parts respectively into the first and second holes, and then expanding the first and second grasping parts so as to bring the first and second grasping parts into contact with inner walls of the first and second holes, and grasping the core and applying a force that suppresses the turning moment to the core.

In the core grasping method according to the present disclosure, at least one of the first and second holes has the inside diameter that decreases in the opposite direction from the direction of the turning moment occurring on the core. To grasp the core, the first and second grasping parts are expanded and the first and second grasping parts are brought into contact with the inner walls of the first and second holes of the core, and the core is grasped and a force that suppresses the turning moment is applied to the core. Thus, as the holes have the inside diameter that decreases in the opposite direction from the direction of the turning moment occurring on the core, a force that suppresses the turning moment can be applied to the core upon being grasped. Accordingly, it is possible to suppress the turning moment acting on the core upon being grasped, and thereby improve the positional accuracy in disposing the core.

In the core grasping method according to the present disclosure, both the first and second holes may have the inside diameter that decreases in the opposite direction from the direction of the turning moment, and the core grasping method may involve, when grasping the core, bringing the first and second grasping parts respectively into contact with the inner walls of the first and second holes, and thus applying a force that suppresses the turning moment from the first and second grasping parts to the core.

In a case where both the first and second holes have the inside diameter that decreases in the opposite direction from the direction of the turning moment, each of the first and second holes can be formed by cutting out the core from one direction, and therefore the first and second holes can be easily formed.

In the core grasping method according to the present disclosure, the core may be placed on a platform; the first hole may have the inside diameter decreases in a direction away from the platform; the second hole may have the inside diameter that decreases in a direction toward the platform; and the core grasping method may involve, when grasping the core, expanding the second grasping part before the first gasping part to grasp the core.

Thus, it is possible to exert a downward force on the core and press the core against the platform by forming the second hole having the inside diameter that decreases toward the platform, and expanding the second grasping part inserted in the second hole before the first grasping part inserted in the first hole when grasping the core. Accordingly, the positional accuracy in grasping the core can be improved.

The core grasping method according to the present disclosure may involve, when grasping the core, expanding the first grasping part at a lower pressure than the second grasping part.

Thus, expanding the first grasping part that exerts an upward force on the core at a lower pressure than the second grasping part that exerts a downward force on the core can prevent the core from being lifted up from the platform, so that the positional accuracy with which the core grasping apparatus grasps the core can be improved.

In the core grasping method according to the present disclosure, at least one of the first and second holes may have the inside diameter that decreases from a position at or near a center of the hole in the vertical direction toward each of an upper opening and a lower opening of the hole.

If at least one of the first and second holes has the inside diameter that decreases from a position at or near the center of the hole in the vertical direction to each of the upper opening and the lower opening of the hole, both an upward force and a downward force can be applied to the inner wall of the hole of the core. Accordingly, it is possible to suppress the turning moment on the core, and thereby grasp the core more firmly and stably.

The present disclosure can provide a core grasping method that can improve the positional accuracy in disposing the core.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5C is a sectional view illustrating an action of grasping the core by the core grasping method according to the embodiment;

FIG. 6 is a sectional view showing a state where a core is grasped by a core grasping method according to a comparative example;

DETAILED DESCRIPTION OF EMBODIMENTS

Figure 1:
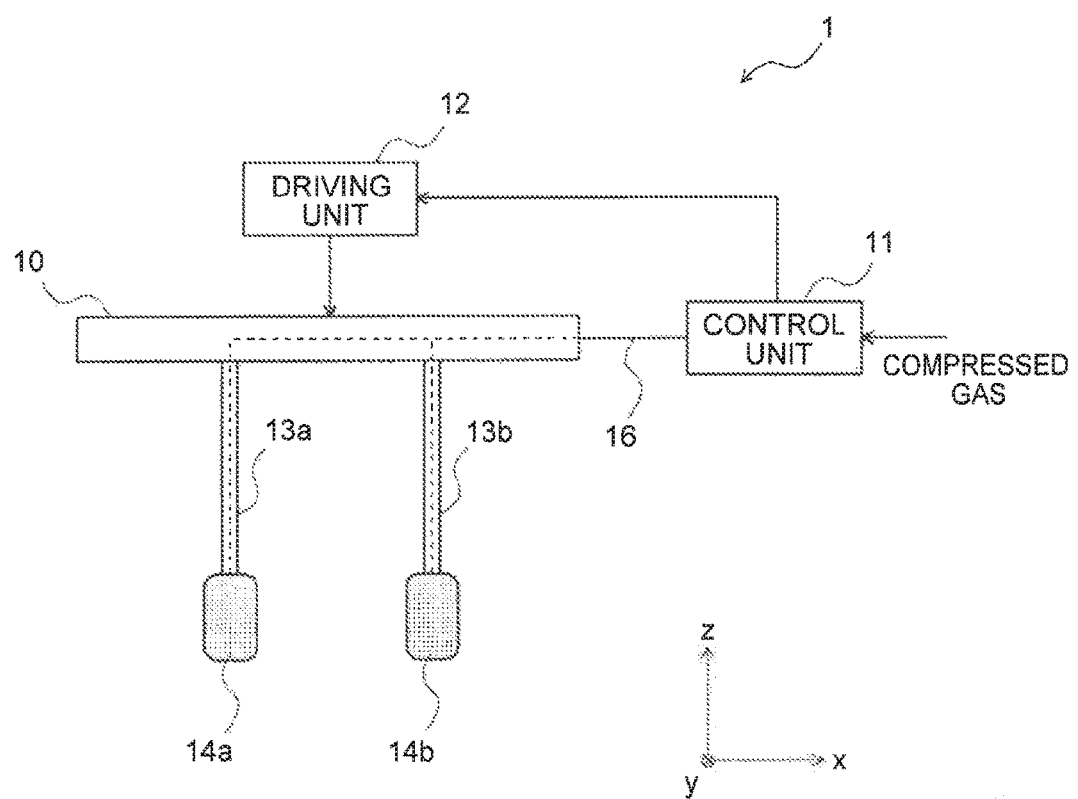
FIG. 1 is a front view showing a core grasping apparatus according to an embodiment.

An embodiment of the present disclosure will be described below with reference to the drawings. FIG. 1 is a front view showing a core grasping apparatus according to the embodiment. As shown in FIG. 1, a core grasping apparatus 1 includes a support 10, a control unit 11, a driving unit 12, and pickers (grasping devices) 13$a$, 13$b$. Each of the pickers 13$a$, 13$b$ is fixed to the support 10 so as to extend downward (in a minus Z-axis direction) from a lower surface of the support 10. The support 10 and the pickers 13$a$, 13$b$ are required to grasp and support a core, and are therefore required to have a certain level of strength. For example, the support 10 and the pickers 13$a$, 13$b$ can be composed of a metal material.

Grasping parts 14$a$, 14$b$ are provided respectively at leading ends of the pickers 13$a$, 13$b$. The grasping parts 14$a$, 14$b$ are configured to be expandable and contractible with a fluid such as a gas or a liquid (hereinafter, an example where a gas is used will be described), and, for example, can be formed by an elastic member such as rubber. The grasping parts 14$a$, 14$b$ can be formed by rubber balloons.

The driving unit 12 is configured to be able to move the support 10. As the pickers 13$a$, 13$b$ are fixed to the support 10, the pickers 13$a$, 13$b$ fixed to the support 10 are moved when the support 10 is moved by the driving unit 12. For example, the driving unit 12 can move the support 10 along an x-axis, a y-axis, and a z-axis. For example, a robot arm can be used as the driving unit 12.

The control unit 11 controls the driving unit 12. Specifically, the control unit 11 moves the support 10 using the driving unit 12, and thereby moves the pickers 13$a$, 13$b$ to predetermined positions. Moreover, the control unit 11 controls expansion and contraction of the grasping parts 14$a$, 14$b$ of the pickers 13$a$, 13$b$. For example, the control unit 11 includes a solenoid valve (not shown) that switches between a state where a compressed gas (primary side) supplied to the control unit 11 is supplied to a pipe 16 leading to the grasping parts 14$a$, 14$b$ and a state where the pipe 16 and an exhaust port (vent) are connected to each other, and the control unit 11 controls expansion and contraction of the grasping parts 14$a$, 14$b$ of the pickers 13$a$, 13$b$ by switching this solenoid valve.

Specifically, the control unit 11 can expand the grasping parts 14$a$, 14$b$ by supplying the compressed gas (primary side), supplied to the control unit 11, to the pipe 16. The control unit 11 can contract the grasping parts 14$a$, 14$b$ by connecting the pipe 16 to the exhaust port (vent). In this embodiment, the grasping parts 14$a$, 14$b$ are configured to expand and contract at independent timings. For example, the pipes 16 respectively connected to the grasping parts 14$a$, 14$b$ can be provided as separate systems so that the grasping parts 14$a$, 14$b$ can be expanded and contracted at independent timings.

Figure 2:
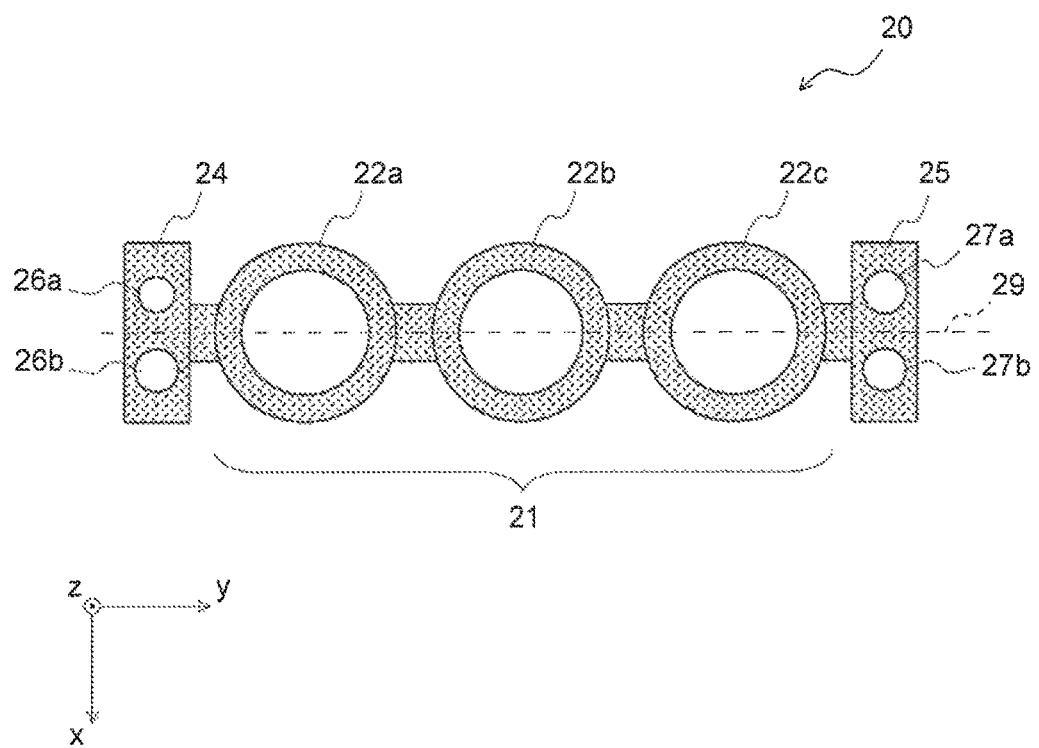
FIG. 2 is a plan view showing an example of a core that is grasped with the core grasping apparatus according to the embodiment.
Figure 3:
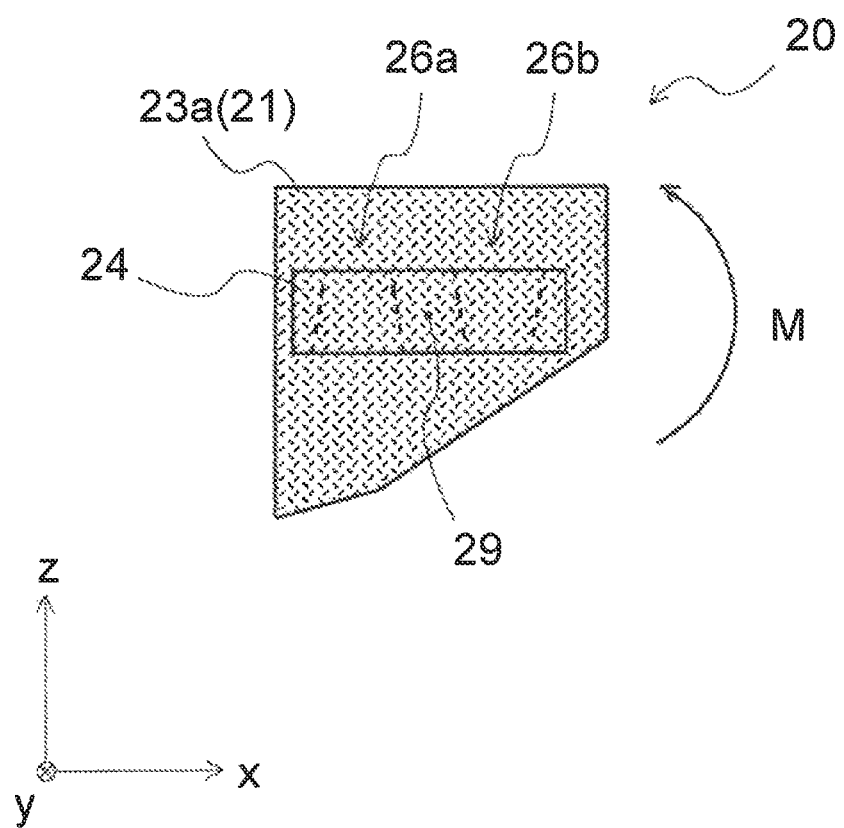
FIG. 3 is a side view of the core shown in FIG. 2.

FIG. 2 is a plan view showing an example of a core that is grasped with the core grasping apparatus 1. FIG. 3 is a side view of the core shown in FIG. 2, and is a side view of a core 20 as seen from a minus side in a y-axis direction. As shown in FIG. 2, the core 20 has a core main body 21 and core prints 24, 25. The core main body 21 has molds 22$a$ to 22$c$ formed therein to form hollows inside a cast article. The molds 22$a$ to 22$c$ have the same shape, and casting with the molds 22$a$ to 22$c$ placed inside a die of a cast article can form hollows corresponding to the molds 22$a$ to 22$c$ inside the cast article.

The core prints 24, 25 are parts that are provided to stabilize the core 20 when the core 20 is placed inside a die, and in the example shown in FIG. 2, the core prints 24, 25 are formed by extending both end portions of the core main body 21. For example, when the core 20 is placed inside the die, the core prints 24, 25 are supported on the die. The core prints 24, 25 have respectively holes 26$a$, 26$b$ and 27$a$, 27$b$ formed therein that allow the core 20 to be grasped. The holes 26$a$, 26$b$, 27$a$, 27$b$ are open in a vertical direction (z-axis direction), and are formed so as to extend in the vertical direction (z-axis direction). For example, the core 20 is made of sand.

As shown in FIG. 3, in the case where the shape of the core main body 21 (die 23a) of the core 20 is bilaterally asymmetric in an xz-plane around a central axis 29 that is parallel to the y-axis, a turning moment M around the central axis 29 acts on the core 20. Thus, when the core 20 is grasped with the core grasping apparatus 1, the turning moment M around the central axis 29 acts on the core 20, which may cause the core 20 being grasped to turn. However, even in the case where the turning moment M acts on the core 20, using a core grasping method according to this embodiment to be described below can prevent the core 20 from inclining upon being lifted up, and thereby improve the positional accuracy in disposing the core 20.

Figure 4:
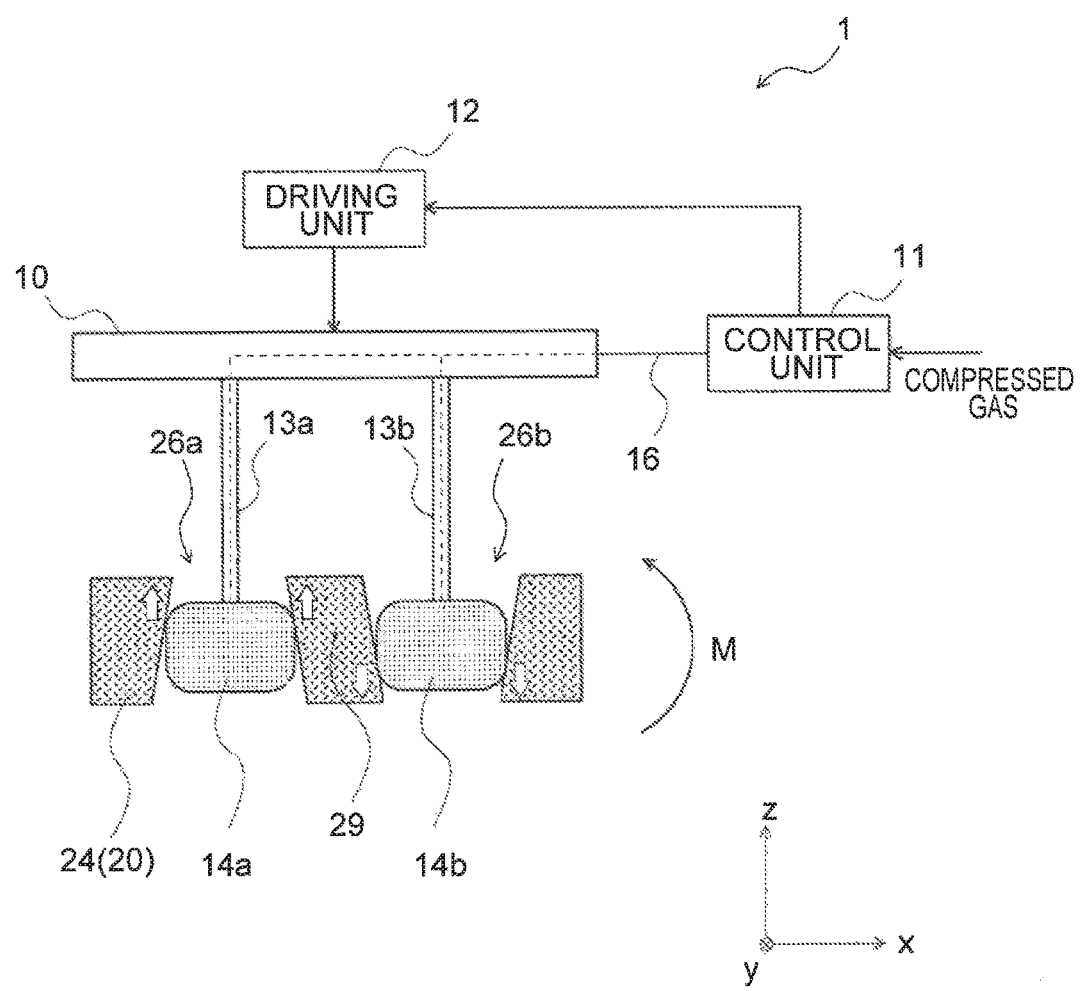
FIG. 4 is a sectional view showing a state where the core grasping apparatus according to the embodiment is grasping the core.

FIG. 4 is a sectional view showing a state where the core grasping apparatus according to this embodiment is grasping the core. The sectional view of the core 20 (core print 24) in FIG. 4 shows a cross-section of the core print 24 of the core 20 shown in FIG. 2 cut along an xz-plane passing through the holes 26a, 26b. As shown in FIG. 4, the holes 26a, 26b are provided in the core print 24 of the core 20 respectively on both sides in a horizontal direction (x-axis direction) around the central axis 29 (i.e., on left and right sides of the central axis 29). The holes 26a, 26b are open in the vertical direction. The holes 26a, 26b formed in the core print 24 of the core 20 each have a shape of which the inside diameter decreases in the opposite direction from the direction of the turning moment M occurring on the core 20 (counterclockwise direction in FIG 4).

Specifically, the hole 26a formed in the core print 24 of the core 20 has such a tapered shape that the inside diameter (opening diameter) of the hole 26a decreases gradually toward a plus side in the z-axis direction (upper side). In the hole 26a, the direction toward the plus side in the z-axis direction (upper side) is the opposite direction from the direction of the turning moment M occurring on the core 20 around the central axis 29.

On the other hand, the hole 26b formed in the core print 24 of the core 20 has such a tapered shape that the inside diameter (opening diameter) of the hole 26b decreases gradually toward a minus side in the z-axis direction (lower side). In the hole 26b, the direction toward the minus side in the z-axis direction (lower side) is the opposite direction from the direction of the turning moment M occurring on the core 20 around the central axis 29.

To thus form each of the holes 26a, 26b in a shape (e.g., tapered shape) of which the inside diameter decreases in the opposite direction from the direction of the turning moment, each of the holes 26a, 26b can be formed by cutting out the core print 24 from one direction, and therefore the holes 26a, 26b can be formed easily. Specifically, to form the hole 26a, the core print 24 can be cut out from the minus side in the z-axis direction (lower side), and to form the hole 26b, the core print 24 can be cut out from the plus side in the z-axis direction (upper side), and thus the tapered holes 26a, 26b can be formed.

In this embodiment, the pickers 13a, 13b are inserted respectively into the holes 26a, 26b formed in the core print 24 of the core 20, and the grasping parts 14a, 14b provided respectively at the leading ends of the pickers 13a, 13b are expanded to grasp the core print 24. Thus, as the grasping parts 14a, 14b are expanded inside the holes 26a, 26b, the pickers 13a, 13b and the core print 24 of the core 20 are fixed to each other.

Here, the shape of the hole 26a of the core print 24 is such a tapered shape that the inside diameter of the hole 26a decreases gradually toward the plus side in the z-axis direction (upper side). Accordingly, when the grasping part 14a is inserted into the hole 26a and expanded, an upper part of a side surface of the grasping part 14a comes in contact with a side surface of the hole 26a, so that a force directed toward the plus side in the z-axis direction (upper side) is applied from the grasping part 14a to an inner wall of the hole 26a. On the other hand, the shape of the hole 26b of the core print 24 is such a tapered shape that the opening diameter of the hole 26b decreases gradually toward the minus side in the z-axis direction (lower side). Accordingly, when the grasping part 14b is inserted into the hole 26b and expanded, a lower part of a side surface of the grasping part 14b comes in contact with a side surface of the hole 26b, so that a force directed toward the minus side in the z-axis direction (lower side) is applied from the grasping part 14b to an inner wall of the hole 26b.

In this way, the force directed toward the plus side in the z-axis direction (upper side) is applied to the inner wall of the hole 26a of the core print 24, while the force directed toward the minus side in the z-axis direction (lower side) is applied to the inner wall of the hole 26b of the core print 24, so that the turning moment M around the central axis 29 (the axis parallel to the y-axis) acting on the core print 24 can be suppressed.

While FIG. 4 shows the state where the core grasping apparatus 1 is grasping the one core print 24 of the core 20 shown in FIG. 2, to lift up the core 20, the core grasping apparatus also grasps the other core print 25 of the core 20, and thus lifts up the core 20 with the core prints 24, 25 on both sides of the core 20 grasped. Also when the core grasping apparatus grasps the other core print 25 of the core 20, the grasping parts of the pickers are inserted into the holes 27a, 27b of the core print 25 and expanded to grasp the core. In this case, the holes 27a, 27b of the core print 25 may have cylindrical shapes, or may have tapered shapes like those of the holes 26a, 26b of the core print 24 This is because, since the turning moment M acting on the core 20 can be suppressed on the side of the core print 24 of the core 20, it is not necessary to form the holes 27a, 27b of the core print 25 in tapered shapes. However, to more reliably suppress the turning moment M acting on the core 20, it is preferable that the holes 27a, 27b of the core print 25 be formed in tapered shapes so as to suppress the turning moment M at both of the core prints 24, 25.

Next, actions of grasping the core by the core grasping method according to this embodiment will be described in detail using the sectional views shown in FIG. 5A to FIG. 5F. In the following, the actions taken until the core 20 (core print 24) placed on a platform 31 is disposed in a die 32 (see FIG. 5F) using the core grasping apparatus 1 will be described.

Figure 5A:
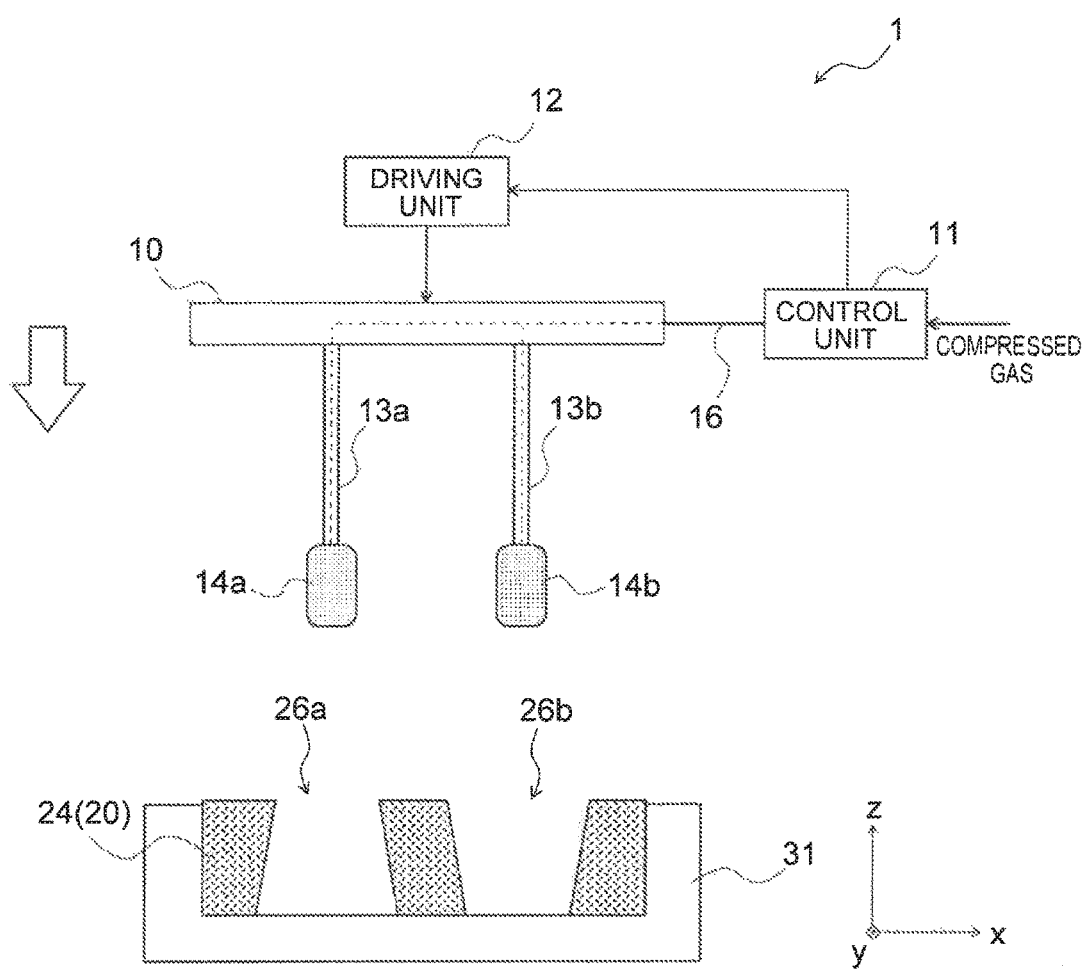
FIG. 5A is a sectional view illustrating an action of grasping the core by a core grasping method according to the embodiment.

First, as shown in FIG. 5A, the core grasping apparatus 1 is moved to a place where the core 20 (core print 24) is placed. Specifically, the support 10 of the core grasping apparatus 1 is moved by the driving unit 12, and the coordinates of the core grasping apparatus 1 in an xy-plane are adjusted so that the core grasping apparatus 1 is disposed above the core print 24. At this point, the pickers 13a, 13b are disposed respectively above the holes 26a, 26b formed in the core print 24.

Figure 5B:
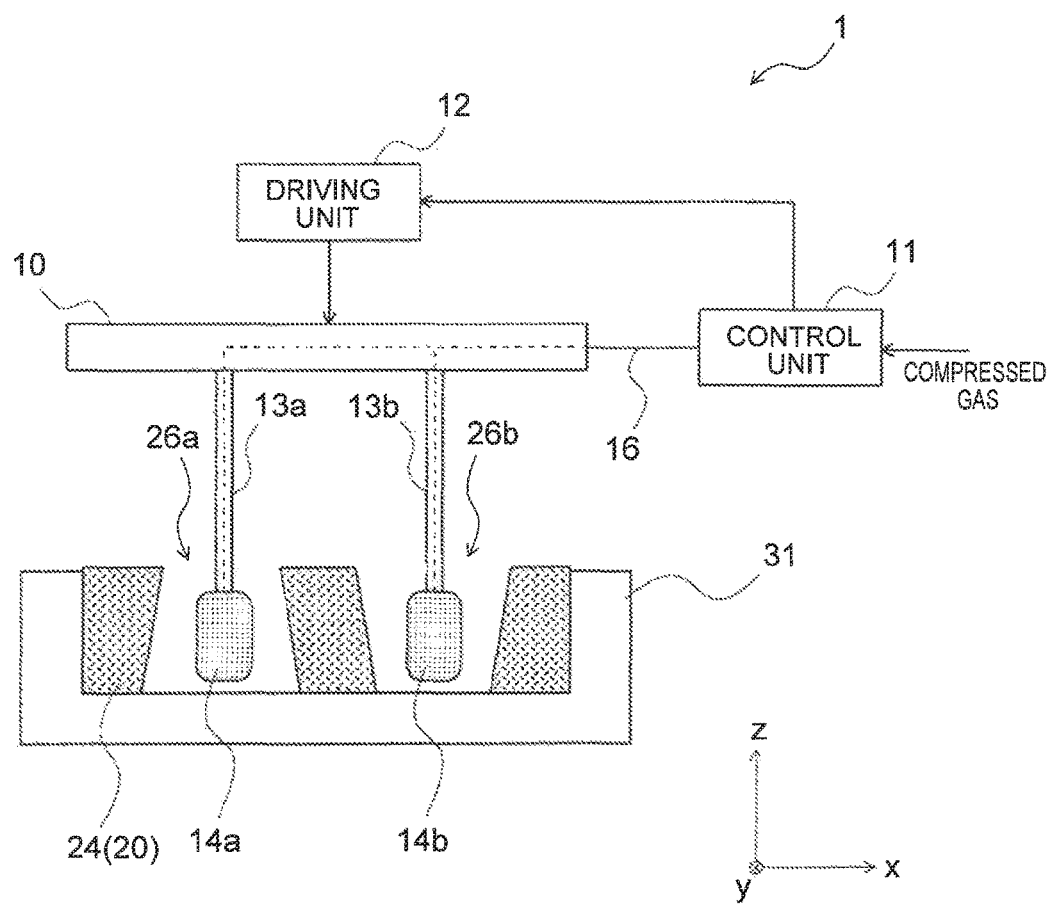
FIG. 5B is a sectional view illustrating an action of grasping the core by the core grasping method according to the embodiment.

Next, the support 10 of the core grasping apparatus 1 is moved downward (in the minus z-axis direction) by the driving unit 12. Thus, the pickers 13a, 13b are moved downward, and as shown in FIG. 5B, the grasping parts 14a, 14*b* of the pickers 13*a*, 13*b* are inserted respectively into the holes 26*a*, 26*b* formed in the core print 24.

Next, as shown in FIG. 5C, the grasping part 14*b* inserted in the hole 26*b* of the core print 24 is expanded. Thus, the grasping part 14*b* inserted in the hole 26*b* of the core print 24 is expanded before the grasping part 14*a* inserted in the hole 26*a*. As a result, the grasping part 14*b* comes in contact with the inner wall (side wall) of the hole 26*b* of the core print 24, and the picker 13*b* is fixed to the core print 24.

Here, the hole 26*b* has such a tapered shape that the opening diameter of the hole 26*b* decreases gradually toward the minus side in the z-axis direction (lower side), in other words, a shape of which the inside diameter decreases with a decreasing distance from the platform 31. Accordingly, a force directed toward the minus side in the z-axis direction (lower side) is applied from the grasping part 14*b* to the inner wall of the hole 26*b* of the core print 24. Thus, a force pressing the core print 24 against the platform 31 acts near the hole 26*b* of the core print 24, so that the positional accuracy with which the core grasping apparatus 1 grasps the core 20 can be improved.

Figure 5D:
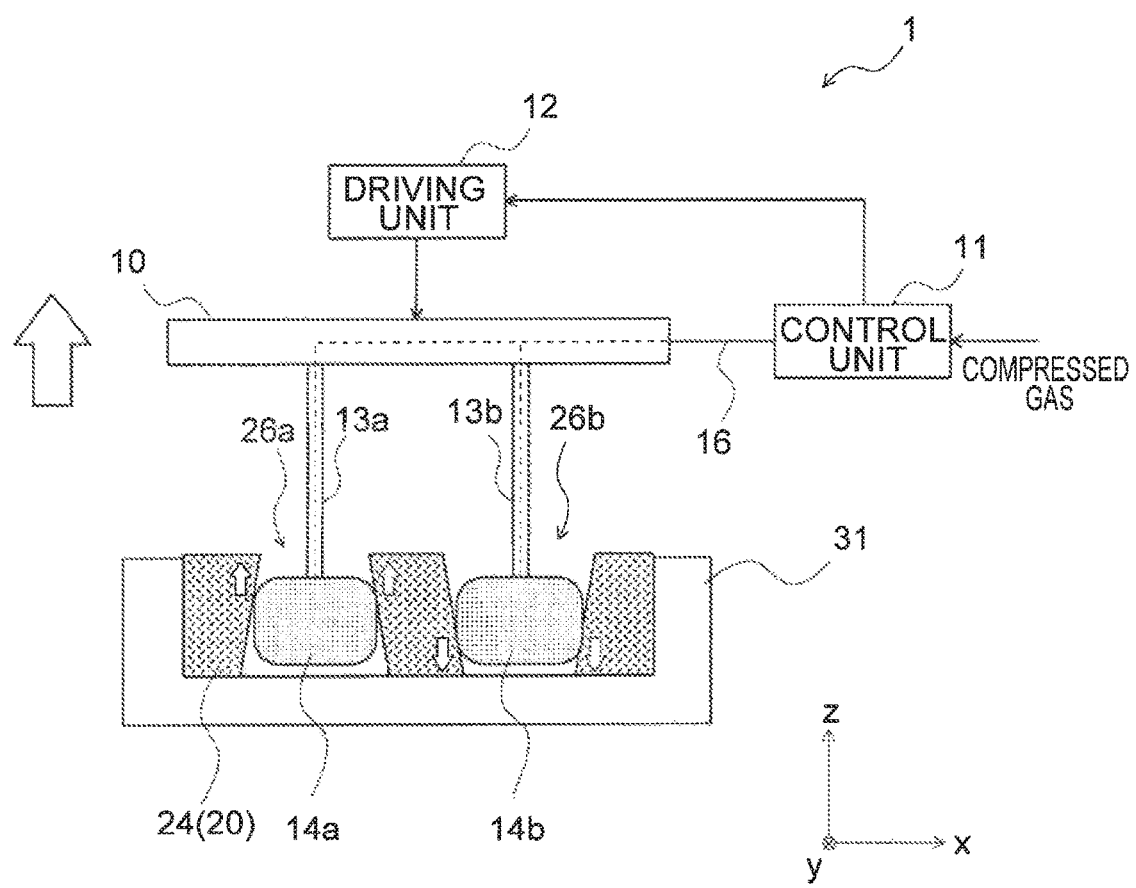
FIG. 5D is a sectional view illustrating an action of grasping the core by the core grasping method according to the embodiment.

Next, as shown in FIG. 5D, the grasping part 14*a* inserted in the hole 26*a* of the core print 24 is expanded. As a result, the grasping part 14*a* comes in contact with the inner wall of the hole 26*a* of the core print 24, and the picker 13*a* is fixed to the core print 24. Here, the hole 26*a* has such a tapered shape that the opening diameter of the hole 26*a* decreases gradually toward the plus side in the z-axis direction (upper side), in other words, a shape of which the inside diameter decreases with an increasing distance from the platform 31. Accordingly, a force directed toward the plus side in the z-axis direction (upper side) is applied from the grasping part 14*a* to the inner wall of the hole 26*a* of the core print 24.

Here, if the grasping part 14*a* is expanded too much, the upward force applied to the hole 26*a* of the core print 24 becomes too large, which may cause the core print 24 to be lifted up from the platform 31. In this embodiment, therefore, the grasping part 14*a* is expanded at a lower pressure than the grasping part 14*b* to grasp the core 20. Accordingly, it is possible to prevent the core print 24 from being lifted up from the platform 31, and thereby improve the positional accuracy with which the core grasping apparatus 1 grasps the core 20.

Through these actions, the grasping parts 14*a*, 14*b* are brought into contact with the inner walls of the holes 26*a*, 26*b* of the core print 24, and the pickers 13*a*, 13*b* and the core print 24 are fixed to each other. Thereafter, in a state where the pickers 13*a*, 13*b* are grasping the core print 24, the support 10 of the core grasping apparatus 1 is moved upward (in the plus z-axis direction) by the driving unit 12. Thus, the pickers 13*a*, 13*b* are moved upward and the core 20 (core print 24) is lifted up.

At this point, a force directed toward the plus side in the z-axis direction (upper side) is applied to the inner wall of the hole 26*a* of the core print 24, while a force directed toward the minus side in the z-axis direction (lower side) is applied to the inner wall of the hole 26*b* of the core print 24, so that the turning moment M around the central axis 29 (the axis parallel to the y-axis) acting on the core print 24 can be suppressed. Accordingly, the core 20 can be prevented from inclining upon being lifted up.

Figure 5E:
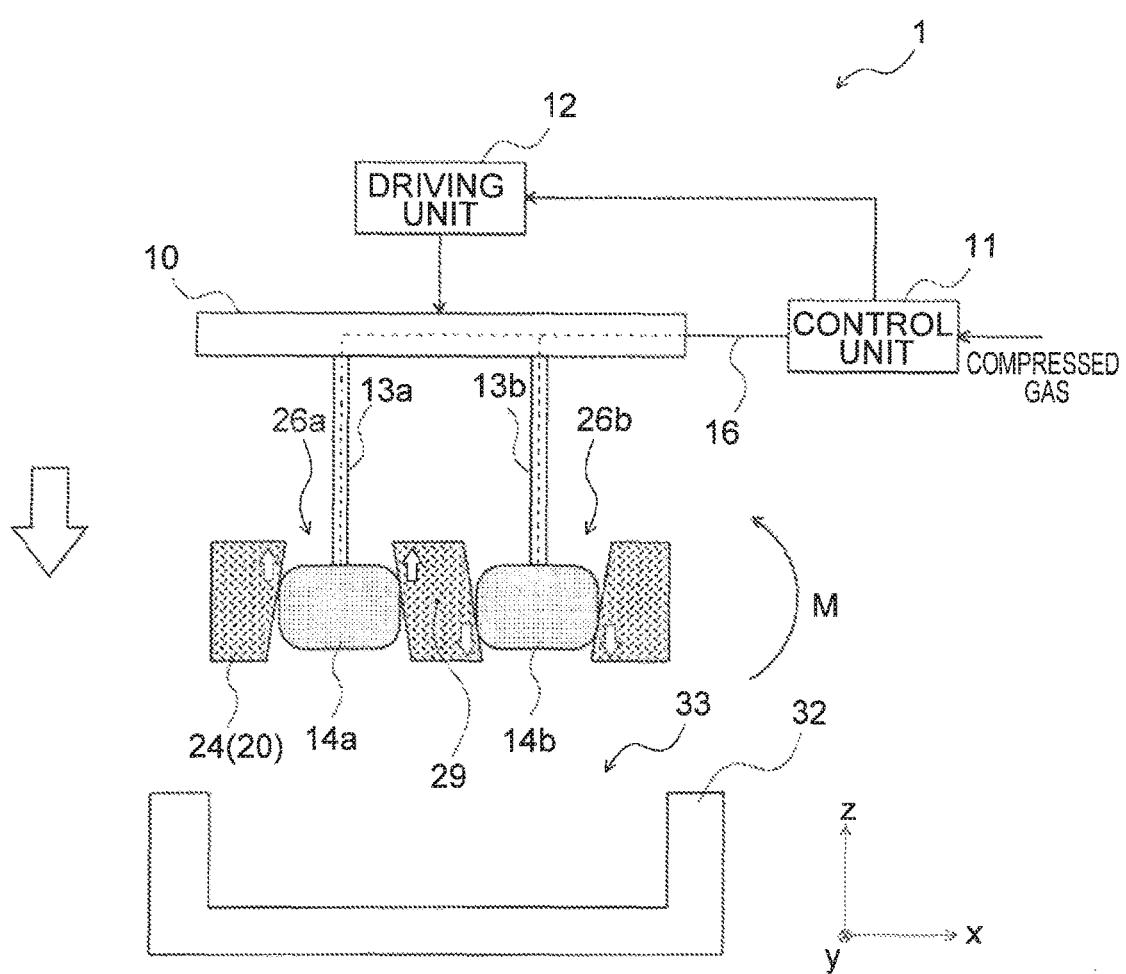
FIG. 5E is a sectional view illustrating an action of grasping the core by the core grasping method according to the embodiment.

Thereafter, as shown in FIG. 5E, in a state where the core grasping apparatus 1 is grasping the core 20 (core print 24), the core grasping apparatus 1 is moved to a place where the die 32 is disposed. Then, the support 10 of the core grasping apparatus 1 is moved downward (in the minus z-axis direction) by the driving unit 12. Thus, the core print 24 is housed inside a recess 33 of the die 32 (see FIG. 5F).

Figure 5F:
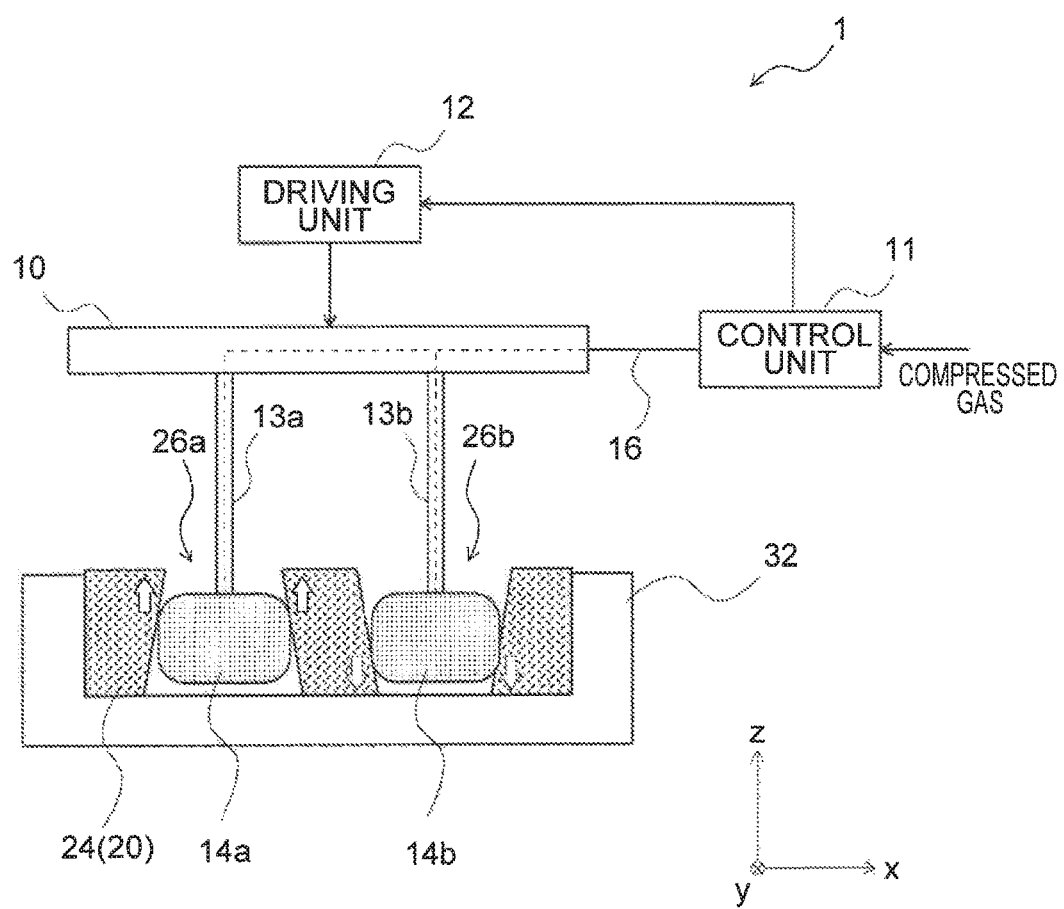
FIG. 5F is a sectional view illustrating an action of grasping the core by the core grasping method according to the embodiment.

After the core print 24 is housed inside the die 32 at a normal position as shown in FIG. 5F, the grasping parts 14*a*, 14*b* of the pickers 13*a*, 13*b* are contracted, and the pickers 13*a*, 13*b* are moved upward. Thus, the pickers 13*a*, 13*b* are extracted from the holes 26*a*, 26*b* of the core print 24.

Through the actions having been described above, the core 20 (core print 24) placed on the platform 31 can be disposed inside the die (see FIG. 5F) using the core grasping apparatus 1.

In this embodiment, the holes 26*a*, 26*b* of the core print 24 each have a tapered shape, in other words, a shape of which the inside diameter decreases in the opposite direction from the direction of the turning moment M occurring on the core 20. Accordingly, when the grasping parts 14*a*, 14*b* are expanded, a force directed toward the plus side in the z-axis direction (upper side) is applied to the inner wall of the hole 26*a* of the core print 24, while a force directed toward the minus side in the z-axis direction (lower side) is applied to the inner wall of the hole 26*b* of the core print 24. Thus, the turning moment M (see FIG. 4) acting on the core print 24 upon grasping the core can be suppressed.

Specifically, as in the comparative example shown in FIG. 6, if holes 126*a*, 126*b* of a core print 124 of a core 120 have cylindrical shapes, when the grasping parts 14*a*, 14*b* are expanded, the grasping parts 14*a*, 14*b* come respectively in contact with inner walls of the holes 126*a*, 126*b*, and thus the grasping parts 14*a*, 14*b* are fixed to the core print 124 of the core 120. In this case, however, contact surfaces of the grasping parts 14*a*, 14*b* and the holes 126*a*, 126*b* in contact with each other are surfaces parallel to the vertical direction (z-axis direction). Accordingly, a force that suppresses the turning moment M is not sufficiently applied from the grasping parts 14*a*, 14*b* to the core print 124 (core 120).

In the core grasping method according to this embodiment, by contrast, the holes 26*a*, 26*b* of the core print 24 each have a tapered shape, in other words, a shape of which the inside diameter decreases in the opposite direction from the direction of the turning moment M occurring on the core 20, so that a force directed toward the plus side in the z-axis direction (upper side) is applied to the inner wall of the hole 26*a* of the core print 24, while a force directed toward the minus side in the z-axis direction (lower side) is applied to the inner wall of the hole 26*b* of the core print 24. Thus, the turning moment M (see FIG. 4) acting on the core print 24 upon grasping the core can be suppressed.

The present disclosure according to the embodiment having been described above can provide a core grasping method that can improve the positional accuracy in disposing the core.

Figure 7:
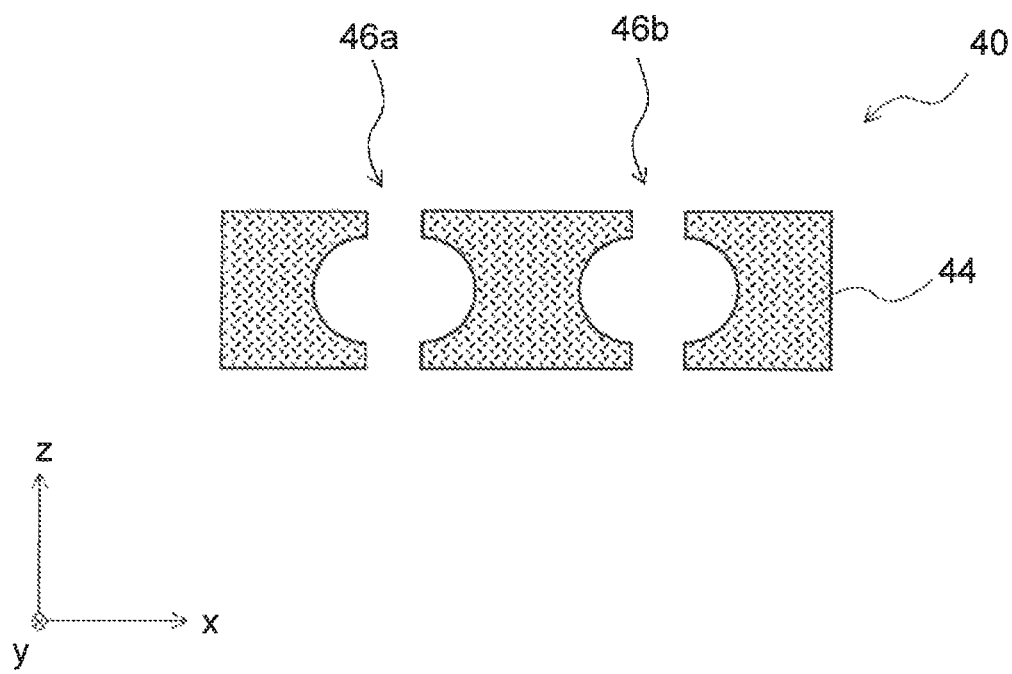
FIG. 7 is a sectional view showing another example of the configuration of a core that is grasped with the core grasping apparatus according to the embodiment.

FIG. 7 is a sectional view showing another example of the configuration of a core that is grasped with the core grasping apparatus according to this embodiment. In this embodiment, holes 46*a*, 46*b* formed in a core print 44 of a core 40 may each have a shape of which the inside diameter decreases from a position at or near a center of the hole in the vertical direction (z-axis direction) toward each of an upper opening and a lower opening of the hole. In the example shown in FIG. 7, the holes 46*a*, 46*b* have spheroidal shapes.

Figure 8A:
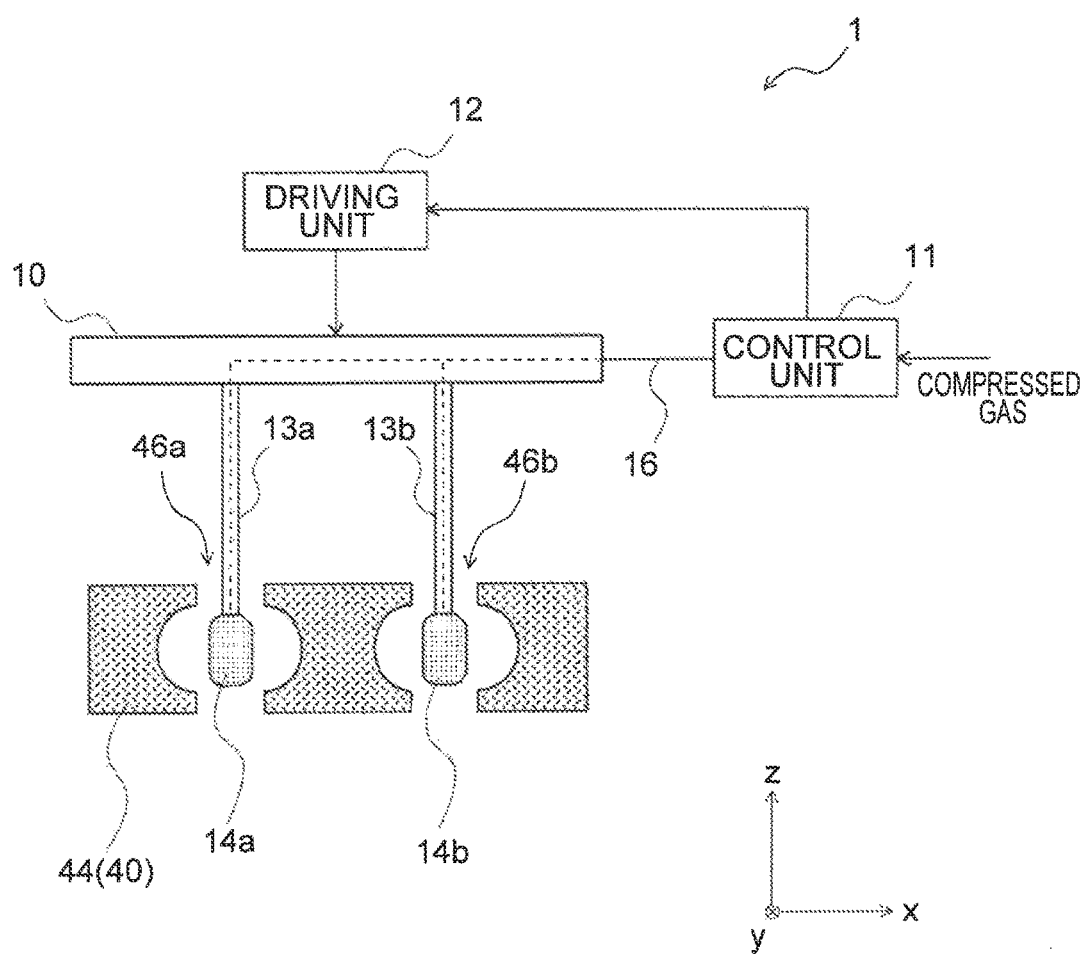
FIG. 8A is a sectional view illustrating another example of the core grasping method according to the embodiment.
Figure 8B:
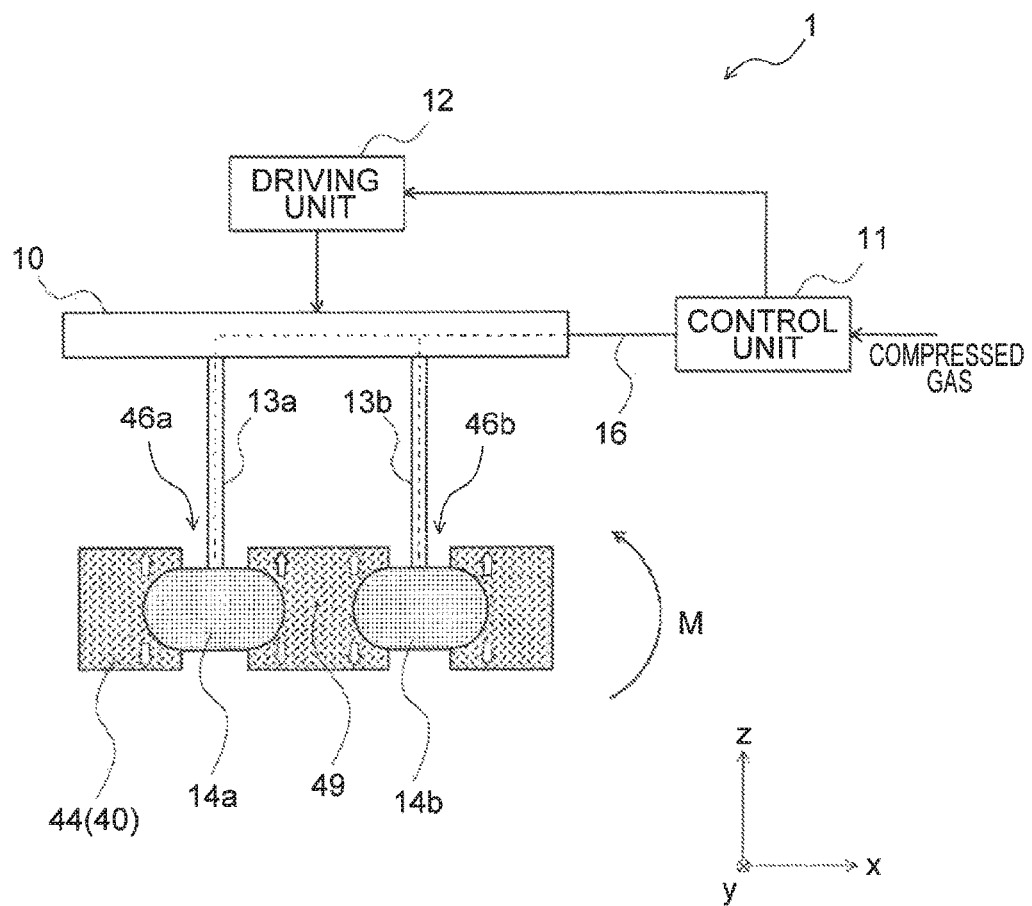
FIG. 8B is a sectional view illustrating the other example of the core grasping method according to the embodiment.

Also to grasp the core 40 shown in FIG. 7, the grasping parts 14*a*, 14*b* of the pickers 13*a*, 13*b* are inserted respectively into the holes 46*a*, 46*b* formed in the core print 44 as shown in FIG. 8A. Then, as shown in FIG. 8B, the grasping parts 14*a*, 14*b* inserted in the holes 46*a*, 46*b* of the core print 44 are expanded. As a result, the grasping parts 14*a*, 14*b* come in contact with inner walls of the holes 46a, 46b of the core print 44, and the pickers 13a, 13b are fixed to the core print 44.

At this point, an upward force is applied from the grasping part 14a to an upper part of the inner wall of the hole 46a of the core print 44. While a downward force is applied from the grasping part 14a to a lower part of the inner wall of the hole 46a of the core print 44. Similarly, an upward force is applied from the grasping part 14b to an upper part of the inner wall of the hole 46b of the core print 44, while a downward force is applied from the grasping part 14b to a lower part of the inner wall of the hole 46b of the core print 44.

Also in the case shown in FIG. 8B, the turning moment M acts on the core 40 around a central axis 49. However, since the holes 46a, 46b of the core print 44 are each formed in a shape of which the inside diameter decreases in the opposite direction from the direction of the turning moment M occurring on the core 40, a force that suppresses the turning moment M acts on the inner walls of the holes 46a, 4611 of the core print 44. Specifically, an upward force is applied from the grasping part 14a to the upper part of the inner wall of the hole 46a of the core print 44, and this force acts as a force that suppresses the turning moment M. Meanwhile, a downward force is applied from the grasping part 14b to the lower part of the inner wall of the hole 46b of the core print 44, and this force acts as a force that suppresses the turning moment M.

Moreover, in the case shown in FIG. 8B, both the upward force and the downward force can be applied to the inner walls of the holes 46a, 46b of the core print 44, so that the core 40 (core print 44) can be grasped with the core grasping apparatus 1 more firmly and stably.

Figure 9:
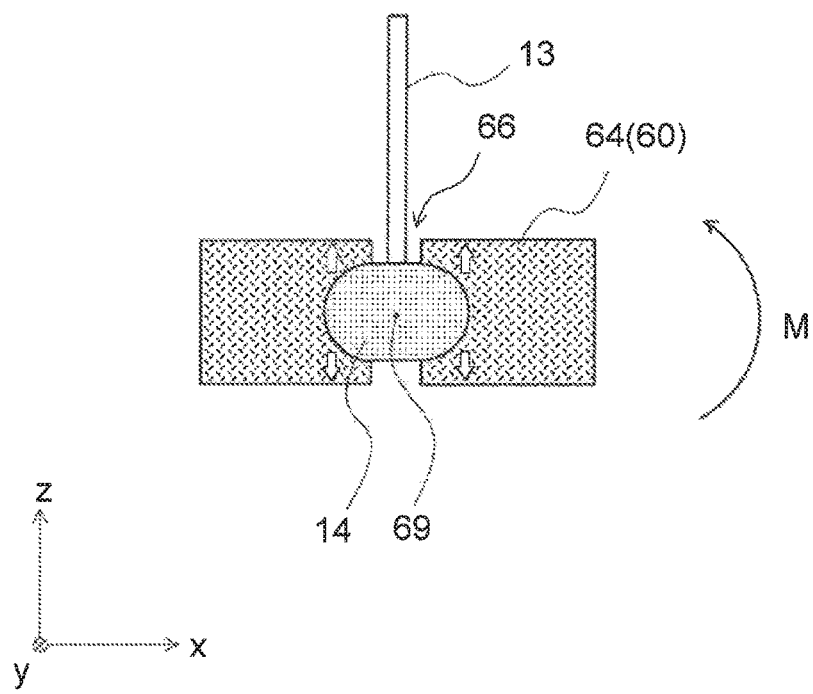
FIG. 9 is a sectional view showing another example of the configuration of a core that is grasped with the core grasping apparatus according to the embodiment.

In the case where the hole is formed in a spheroidal shape, as shown in FIG. 9, one hole 66 may be provided in a core print 64 of a core 60, and the hole 66 may be formed in a spheroidal shape. Also in the case shown in FIG. 9, the turning moment M acts on the core 60 around a central axis 69. However, since the hole 66 of the core print 64 has a spheroidal shape, a force that suppresses the turning moment M acts on an inner wall of the hole 66 of the core print 64. Specifically, an upward force is applied from the grasping part 14 to an upper left part of an inner wall of the hole 66 of the core print 64, and this force acts as a force that suppresses the turning moment M. Meanwhile, a downward force is applied from the grasping part 14 to a lower right part of the inner wall of the hole 66 of the core print 64, and this force acts as a force that suppresses the turning moment M.

In this embodiment (except for the configuration shown in FIG. 9) having been described above, the case has been described where each of the two holes of the core is formed in a shape of which the inside diameter decreases in the opposite direction from the direction of the turning moment occurring on the core (the tapered shape shown in FIG. 4 or the spheroidal shape shown in FIG. 7). However, for this embodiment to work, it is only necessary to form at least one of the two holes of the core in a shape of which the inside diameter decreases in the opposite direction from the direction of the turning moment occurring on the core.

For example, one hole 26a shown in FIG. 4 may have a tapered shape while the other hole 26b may have a cylindrical shape (see FIG. 6). For example, one hole 46a shown in FIG. 7 may have a spheroidal shape while the other hole 46b may have a cylindrical shape (see FIG. 6).

Figure 10:
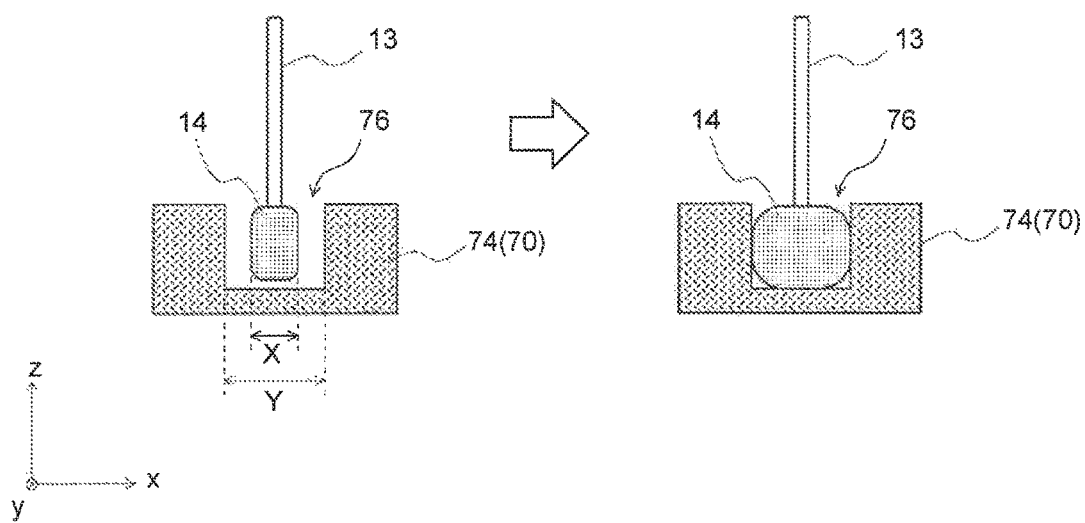
FIG. 10 is a front view illustrating an action of the core grasping apparatus grasping a core.
Figure 11:
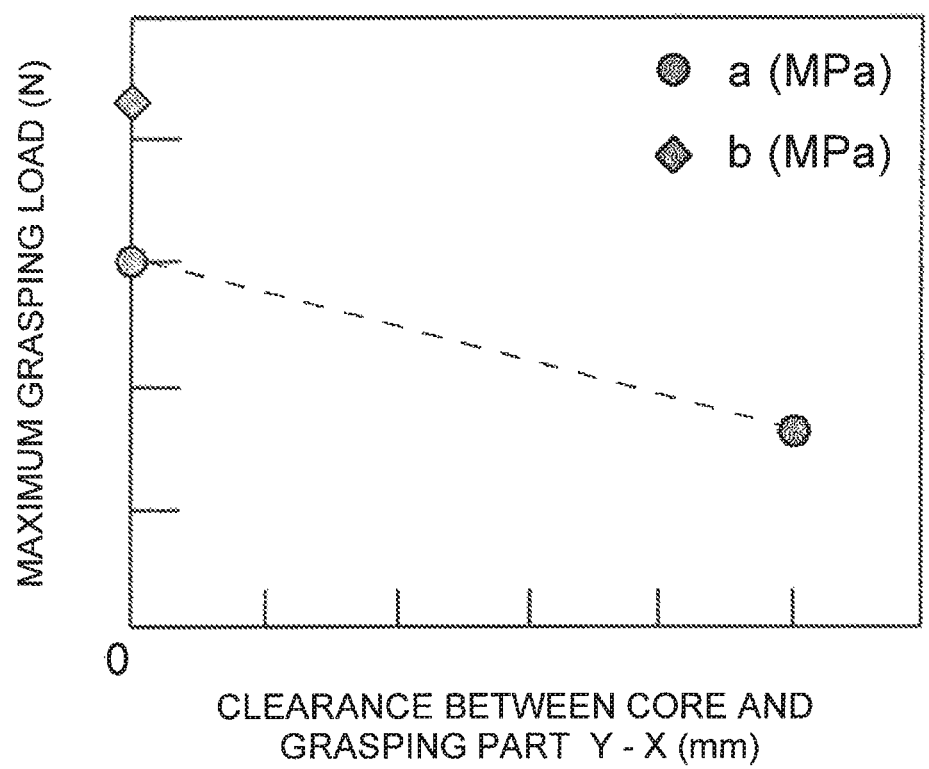
FIG. 11 is a graph showing a relation between a clearance between the core and a grasping part and a maximum grasping load.

FIG. 10 is a front view illustrating an action of the core grasping device grasping a core. FIG. 11 is a graph showing a relation between a clearance between the core and the grasping part and a maximum grasping load. As shown in FIG. 10, to grasp a core print 74 of a core 70 using the picker 13, the grasping part 14 is inserted into a hole 76 formed in the core print 74, and then the grasping part 14 is expanded. As a result, the grasping part 14 and an inner wall of the hole 76 come in contact with each other, and a friction force acts between the grasping part 14 and the inner wall of the hole 76. Thus, the core 70 can be lifted up using the picker 13.

In this case, a maximum grasping load (i.e., the load of the core as a whole) imposed on the grasping part 14 as it grasps and lifts up the core print 74 varies according to a clearance between the grasping part 14 in a contracted state and the core print 74 (Y–X) (see the view on the left in FIG. 10). Here, the symbol X denotes the width of the grasping part 14 in the contracted state, and the symbol Y denotes the opening diameter (diameter) of the hole 76. Thus, the clearance between the grasping part 1.4 and the core print 74 (a total of clearances on both sides) can be expressed as Y–X.

Specifically, as indicated by the data in the graph of FIG. 11 representing the case where the grasping part 14 is expanded at a pressure a (MPa), the maximum grasping load decreases as the clearance between the grasping part 14 in the contacted state and the core print 74 (Y–X) increases. Accordingly, reducing the clearance between the grasping part 14 and the core print 74 (Y–X) shown in FIG. 10 can increase the maximum grasping load.

Conversely, if the clearance between the grasping part 14 and the core print 74 (Y–X) shown in FIG. 10 is too small, positional accuracy is required in disposing the grasping parts 14 at both ends of the core print 74. That is, due to the small clearance between the grasping part 14 and the core print 74 (Y–X), it is necessary to control the positions of the grasping parts 14 with high accuracy so that the grasping parts 14 do not hit the core print 74 while being disposed.

In this embodiment, therefore, the accuracy with which the positions of the grasping parts 14 are controlled and the maximum grasping load (i.e., the load of the core as a whole) need to be taken into account in determining the clearance between the grasping part 14 and the core print 74 (Y–X). As shown in the graph of FIG. 11, the maximum grasping load in the case where the grasping part 14 is expanded at a pressure b (MPa) is larger than that in the case where the grasping part 14 is expanded at the pressure a (MPa) (b>a). Thus, expanding the grasping part 14 at a higher pressure can increase the maximum load of the core to be grasped.

While the present disclosure has been described above on the basis of the embodiment, it should be understood that the disclosure is not limited to the configuration of this embodiment but includes any modifications, adjustments, and combinations that can be conceived of by those skilled in the art within the scope of the claims of the disclosure.

What is claimed is:

1. A core grasping method of grasping a core using a core grasping apparatus,
the core grasping apparatus comprising a first grasping device having a first grasping part and a second grasping device having a second grasping part, the first grasping part and the second grasping part being expandable and contractible,
the core being a core on which a turning moment occurs around a predetermined central axis upon being lifted up, and having a first hole and a second hole that are provided respectively on both sides of the core in a horizontal direction around the central axis and open in a vertical direction, at least one of the first hole and the second hole having an inside diameter that decreases in an opposite direction from a direction of the turning moment occurring on the core, the core grasping method comprising:
   moving the first grasping device and the second grasping device downward, and inserting the first grasping part and the second grasping part respectively into the first hole and the second hole with a driving unit motor; and
   expanding the first grasping part and the second grasping part with gas or liquid supplied to the first and second grasping parts so as to bring the first grasping part and the second grasping part respectively into contact with inner walls of the first hole and the second hole of the core, and grasping the core and applying a force that suppresses the turning moment to the core.

2. The core grasping method according to claim 1, wherein
   both the first hole and the second hole have the inside diameter that decreases in the opposite direction from the direction of the turning moment, and
   the core grasping method comprises, when grasping the core, bringing the first grasping part and the second grasping part respectively into contact with the inner walls of the first hole and the second hole, and applying a force that suppresses the turning moment from the first grasping part and the second grasping part to the core.

3. The core grasping method according to claim 2, wherein
   the core is placed on a platform,
   the first hole has the inside diameter that decreases in a direction away from the platform,
   the second hole has the inside diameter that decreases in a direction toward the platform, and
   the core grasping method comprises, when grasping the core, expanding the second grasping part before the first grasping part to grasp the core.

4. The core grasping method according to claim 3, wherein when grasping the core, expanding the first grasping part at a lower pressure than the second grasping part.

5. The core grasping method according to claim 1, wherein at least one of the first hole and the second hole has the inside diameter that decreases from a portion at or near a center of the hole in the vertical direction toward each of an upper opening and a lower opening of the hole.

* * * * *